United States Patent
Cocca et al.

(10) Patent No.: US 9,188,204 B2
(45) Date of Patent: Nov. 17, 2015

(54) SAFETY APPARATUS FOR USE WITH A SHEAVE

(71) Applicants: Joseph D. Cocca, Houston, TX (US); John Ryan, III, Houston, TX (US)

(72) Inventors: Joseph D. Cocca, Houston, TX (US); John Ryan, III, Houston, TX (US)

(73) Assignee: ALEXANDER/RYAN MARINE & SAFETY CO., Houston, TX (US)

( * ) Notice: Subject to any disclaimer, the term of this patent is extended or adjusted under 35 U.S.C. 154(b) by 95 days.

(21) Appl. No.: 14/176,333

(22) Filed: Feb. 10, 2014

(65) Prior Publication Data

US 2014/0200105 A1    Jul. 17, 2014

Related U.S. Application Data

(63) Continuation-in-part of application No. 13/650,393, filed on Oct. 12, 2012, now Pat. No. 8,789,816.

(51) Int. Cl.
*B66D 3/04* (2006.01)
*F16H 7/18* (2006.01)
*F16P 1/02* (2006.01)

(52) U.S. Cl.
CPC .... *F16H 7/18* (2013.01); *F16P 1/02* (2013.01)

(58) Field of Classification Search
CPC .... B66D 1/54; B66D 3/046; B66D 2700/026; F16P 1/02; F16H 7/18
USPC .......................... 254/391, 393, 401, 405, 374
See application file for complete search history.

(56) References Cited

U.S. PATENT DOCUMENTS

| | | | |
|---|---|---|---|
| 968,304 A | 8/1910 | Winslow | |
| 1,175,065 A | 3/1916 | H. Kotten | |
| 1,432,098 A * | 10/1922 | Benedict | 474/147 |
| 1,600,208 A * | 9/1926 | Amneus | 474/144 |
| 1,820,322 A | 8/1931 | Polkosnik | |
| 2,623,732 A * | 12/1952 | Morgan | 254/391 |
| 2,762,606 A * | 9/1956 | Morse | 254/393 |
| 3,776,368 A * | 12/1973 | Brauss | 182/19 |
| 4,114,473 A | 9/1978 | Pollak | |
| 4,139,064 A | 2/1979 | Dobberpuhl | |
| 4,301,994 A * | 11/1981 | Lindsey | 254/134.3 PA |
| 4,648,855 A | 3/1987 | Palloch et al. | |
| 4,917,656 A | 4/1990 | Sato et al. | |
| 5,180,343 A | 1/1993 | Reed | |
| 5,368,281 A * | 11/1994 | Skyba | 254/391 |
| 5,461,848 A | 10/1995 | Anthony | |
| 5,820,108 A * | 10/1998 | Ostrobrod | 254/281 |
| 5,957,796 A | 9/1999 | McLean | |
| D540,256 S | 4/2007 | Bullock, Jr. | |
| 7,658,264 B2 * | 2/2010 | Mauthner | 182/5 |
| 2006/0197072 A1 * | 9/2006 | Huang | 254/217 |
| 2011/0068311 A1 * | 3/2011 | Rogelja | 254/391 |
| 2011/0072622 A1 * | 3/2011 | Stone | 24/134 R |
| 2011/0204306 A1 * | 8/2011 | Kingery | 254/391 |

* cited by examiner

*Primary Examiner* — Emmanuel M Marcelo
(74) *Attorney, Agent, or Firm* — Egbert Law Offices, PLLC

(57) ABSTRACT

A safety apparatus safety apparatus for use with a sheave has a first plate suitable for placement over one side of the sheave, a second plate suitable for placement on an opposite side of the sheave, and a carriage positioned at a periphery of the first and second plates. The carriage extends across a gap between the plates. The carriage is movable along the peripheries of the first and second plates. The carnage includes a first carriage and a second carriage which are independently movable with respect to each other. The carriage includes a first body, a second body, and a discoidal member pivotally mounted to the first and second bodies. The discoidal member has a hole suitable for allowing the cable of the sheave to pass freely therethrough.

18 Claims, 3 Drawing Sheets

SAFETY APPARATUS FOR USE WITH A SHEAVE

CROSS-REFERENCE TO RELATED APPLICATIONS

The present application is a continuation-in-part of U.S. patent application Ser. No. 13/650,393, filed on Oct. 12, 2012, and entitled "Hand Protection Safety Apparatus for Use with Sheaves and Pulleys", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to safety apparatus for use with sheaves and pulleys. More particularly, the present invention relates to a safety apparatus that prevents fingers from entering into an area adjacent to the sheave or pulley. Additionally, the present invention relates to a safety apparatus that can be mounted to the sheave or pulley and which is adaptable to the various orientations of the cable extending from the sheave or pulley.

2. Description of Related Art Including Information Disclosed Under 37 CFR 1.97 and 37 CFR 1.98.

Pulleys and sheaves are used in a wide variety of offshore operations. In certain circumstances, the sheaves or pulleys can be supported from an overhead position so as to facilitate the ability to lift an object from a location so as to move the object to another location. In other circumstances, the pulleys or sheaves may extend in a horizontal orientation adjacent to a floor. In this configuration, the pulleys and/or sheaves can be utilized so as to adjustably position an object on the floor. During the use of such pulleys and sheaves, the operators will typically manipulate a line by pulling oil the line. The use of the pulleys and sheaves facilitates the ability, by way of mechanical advantage, to direct an object to another location. Typically, operators will wear gloves while manipulating the line that extends over the pulley.

In some or certain circumstances, the worker associated with such pulleys may move their hands very close to the actual pulley. If the gloved hand should move too close to the pulley, there is a possibility of the glove being caught in the area between the line and the pulley. This can draw the worker's hand into the pulley. Under such circumstances, finger severing or impalement can occur. As such, a need has developed so as to pro vide a safety apparatus that effectively prevents the worker from ever encountering the situation where his or her fingers are drawn into the pulley.

As used herein, the term "sheave" can refer to a block, a pulley, or combinations thereof. The term "pulley" and "sheave" are used interchangeably herein. Additionally, the term "line" can refer to ropes, wire ropes, cords, cables and belts.

It is important to note that the operation of sheaves and pulleys can cause the line to extend at various angles. Under certain circumstances, there will be a relatively wide angle between the portions of the line that extend between the worker and the object to be manipulated. In other circumstances, the line will extend generally adjacent to the object to be manipulated. As such, any safety apparatus would have to be adaptable to the various orientations of line that are required in the particular applications.

In the past, various patents have issued relating to safety and protection devices for use with sheaves and pulleys.

For example, U.S. Pat. No. 968,304, issued on Aug. 23, 1910 to G. H. Winslow, describes a pulley guard. This pulley guard includes a shield in the form of a disc or plate having an upper portion provided with a slot terminating in an enlarged aperture to receive and lock over a headed stud or support. The disc or plate has a lower portion that covers the rotary member and is provided with a slot to slidingly engage the shaft of the rotary member. There is an aperture above the slot to afford access to the rotary member. A means is provided for adjusting and locking the plate in different positions on the support.

U.S. Pat. No. 1,175,065, issued on Mar. 14, 1916 to H. Kotten, provides a shaft and pulley guard. In particular, there is shaft guard, a means for vertically adjusting and supporting the shaft guard, a pulley guard formed in sections and having an interlocking engagement with one portion of the shaft guard, and a means for supporting and relatively adjusting the pulley guard sections transversely.

U.S. Pat. No. 1,820,322, issued on Aug. 25, 1931 to B. L. Polkosnik, teaches a pulley guard and banger. This pulley guard and hanger is stamped from a single piece of sheet metal so as to present a central bar member having extensions reaching in opposite directions at right angles from its ends. The bar is bent to produce an open loop extending outwardly. The extensions are looped to encompass the sides of the pulley. The free ends of the side loops are overlapped and secured to the junction of the connected ends.

U.S. Pat. No. 4,114,473, Sep. 19, 1978 to H. M. Pollak, describes guard for belt pulley. The guard includes a top wall for overlying a portion of the pulley's side face between the nips of the belt and the pulley. A side wall is connected to the top wall and extending generally at right angles therefrom. The guard has three projections on the side wall with each projection terminating in an arcuate end face juxtaposed to the inner diameter of one of the grooves of the pulley. Each arcuate end face on the projections has a center of curvature corresponding to the axis of rotation of the pulley. A mounting means is connected to one of the walls for mounting the walls in a position so that each of the projections enters one of the pulley grooves and one projection occupies substantially all the pulley grooves that are unoccupied by the belt.

U.S. Pat. No. 4,139,064, issued on Feb. 13, 1979 to D. R. Dobberpuhl, provides a belt guard for a rotary tiller. The guard encloses the belt and has its forward end pivotally supported on a bracket fixed to the engine by a fastener which also serves to retain a belt guide in place. The rear end of the belt guard is supported for swinging about the forward connection.

U.S. Pat. No. 4,648,855, issued on Mar. 10, 1987 to Palloch et al., discloses a belt guard for industrial sewing machines which includes a cover made of two cover halves that can be clasped together. The cover extensively covers a V-belt pulley part.

U.S. Pat. No. 4,917,656, issued on Apr. 17, 1990 to Sato et al., provides a rear belt guard for use in a sewing machine. The guard member is fixed to the table for covering a rear portion of a belt of the belt device that is exposed on the table. The guard member has an inclined wall upper portion provided with a notched recess for receiving the belt when the head is turned rearwardly. A cover member is openable and slidable over the notched recess. The cover member is urged by a spring in as direction to be closed.

U.S. Pat. No. 5,180,343, issued on Jan. 19, 1993 to M. A. Reed, discloses a pulley guard apparatus that can be mounted to an interior surface of projecting flanges mounted on the pulley structure. Arcuate discs are arranged in confrontation in an edge-to-edge relationship with outer edges of the first and second pulley flanges preventing the binding and abrasion of a pulley belt.

U.S. Pat. No. 5,461,848, issued on Oct. 31, 1995 to L. Anthony, provides as mower pulley guard for covering a wheel pulley. A semi-circular panel is positionable over the wheel pulley of the mower. A pair of lateral panels extend from opposed ends of the semi-circular panel and cooperate with a pair of mounting projections to secure the semi-circular panel to a pulley housing of the mower. The device cooperates with a cover plate of the mower to fully enclose the wheel pulley to preclude an entrance of debris into the pulley housing.

U.S. Pat. No. 5,957,796, issued on Sep. 28, 1999 to V. McLean, provides a belt guard having a main rear wall with two slots for engaging over a pair of shafts of the pump jack at the drive belt on the pulleys on the drive shafts. The rear cover portion includes a peripheral wall extending around the sides and top of the peripheral edge with the bottom of the cover panel being opened. A front panel portion fits over the rear cover panel with a lip engaging onto the peripheral wall to which it is secured.

U.S. Design Patent No. D540,256, issued on Apr. 10, 2007 to J. R. Bullock., Jr describes a belt guard which includes a first housing that is hingedly connected to a second housing. Hinge pins can be utilized so as to fix the housings into a closed position.

U.S. patent application Ser. No. 13/650,393 is very effective in promoting the hand safety of users of such sheaves. This application describes a safety apparatus that has a sheave with a surface extending circumferentially therearound, a first housing interconnected to the sheave, a second housing interconnected to the sheave and pivotally mounted to the first housing, and a line extending over the surface of the sheave and through the interior of each of the first and second housings. Each of the first and second housings has a hole formed at an end thereof opposite the sheave. The line has a first portion extending through the hole of the first housing and a second portion extending through the hole of the second housing. Bushings are respectively received within the holes of the housings.

With this prior hand safety protection apparatus, it was found that there were certain difficulties. Importantly, in order to install this hand safety protection apparatus, it was necessary to remove the center shaft of the sheave This created certain difficulties in installation. Additionally, it was necessary to thread the cable through each of the bushings so as to allow for the proper installation of the hand safety protection apparatus. Additionally, the manufacturing of the hand safety protection apparatus of this application was somewhat difficult.

It is an object of the present invention to provide a safety device for sheaves and pulleys that effectively prevents impaling or severing of fingers.

It is another object of the present invention to provide a safety device for use with sheaves and pulleys which does not interfere with the standard operation of the pulley, sheave or block.

It is another object of the present invention to provide as safety apparatus for use with sheaves and pulleys which is adaptable to various angles and orientations of the line with respect to the pulley.

It is another object of the present invention provide a safety apparatus which avoids the removal of the center shaft of the sheave.

It is another object of the present invention to provide a safety apparatus that is adaptable over the existing sheave head and nut.

It is another object of the present invention to provide a safety apparatus that avoids any interference with mid-line attachment.

It is another object of the present invention provide a safety apparatus which avoids the need for offset legs.

It is a further object of the present invention to provide as safety apparatus in which the construction utilizes identical components.

It is a further object of the present invention provide as safety apparatus in which the design is easily scalable to the various configurations of sheaves.

It is a further object of the present invention to provide a safety apparatus that is extremely light.

It is another object of the present invention to provide a safety apparatus that allows for cosign compensation of the centerline of the cable relative to the sheave yoke track.

It is still a further object of the present invention to provide a safety apparatus that is easy-to-use, easy to manufacture, easy to install and relatively inexpensive.

These and other objects and advantages of the present invention will become apparent from a reading of the attached specification and appended claims.

BRIEF SUMMARY OF THE INVENTION

The present invention is a safety apparatus for use with the sheave. The safety apparatus includes a first plate suitable for placement over one side of the sheave, a second plate suitable for placement over an opposite side of the sheave, and a carriage positioned at a periphery of the first and second plates. The carriage extends across a gap between the first and second plates. The carriage is movable along the peripheries of the first and second plates. The carriage is suitable for receiving the cable therein.

In the safety apparatus of the present invention, a plurality of fasteners extend between the first and second plates so as to fix the position of the first and second plates relative to the sheave. The first plate has a counterbore on an inner surface thereof. This counterbore corresponds to an outer diameter of the sheave. The first plate will have an identical configuration to that of the second plate. Each of the first and second plates is in the nature of a concave disk in which the peripheries of the first and second plates are separated by a distance less than a distance between the centers of the first and second plates. Each of the first and second plates has an opening formed at the center thereof. This opening is suitable for positioning at an axle or shaft of the sheave.

The carriage of the present invention includes a first carriage and a second carriage. Each of the first and second carriages are independently movable at the peripheries of the first and second plates. The first carriage is suitable for receiving a first portion of the cable therein. The second carriage is suitable for receiving a second portion of the cable therein.

The carriage has a hole extending therethrough. The hole of the carriage has a diameter greater than a diameter of the cable such that the cable can freely slide through the hole. Each of the first and second plates has a track formed at the periphery thereof. The carriage is a first portion received in the track of the first plate and a second portion received in the track of the second plate.

In particular, the carriage includes a first body having a portion positioned at the periphery of the first plate, a second body having a portion positioned at the periphery of the second plate, and a discoidal member pivotally mounted to the first and second bodies. The discoidal member has an interior suitable for allowing the cable to extend freely therethrough. This discoidal member includes a first track member pivotally mounted to the first body. The first track member has as track formed therein. A second track member is pivotally mounted to the second body. The second track member has a track formed therein. The first track member is affixed to the second track member such that the track of the first track member is aligned with the track of the second track member. The first body has a hole formed therein the location away from the periphery of the first plate. The second body has a hole formed therein away from the periphery of the second plate. The first track member has an axle extending therefrom and received within the hole of the first body. The second track member has an axle extending therefrom and received in the hole of the second body. A first C-ring is secured to the axle of the first body. A second C-ring is secured to the axle of the second body. The axles of the first and second bodies are freely rotatable within the holes of the first and second bodies.

This foregoing Section is intended to describe, with particularity, the preferred embodiment of the present invention. It is understood that variations in this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 1:
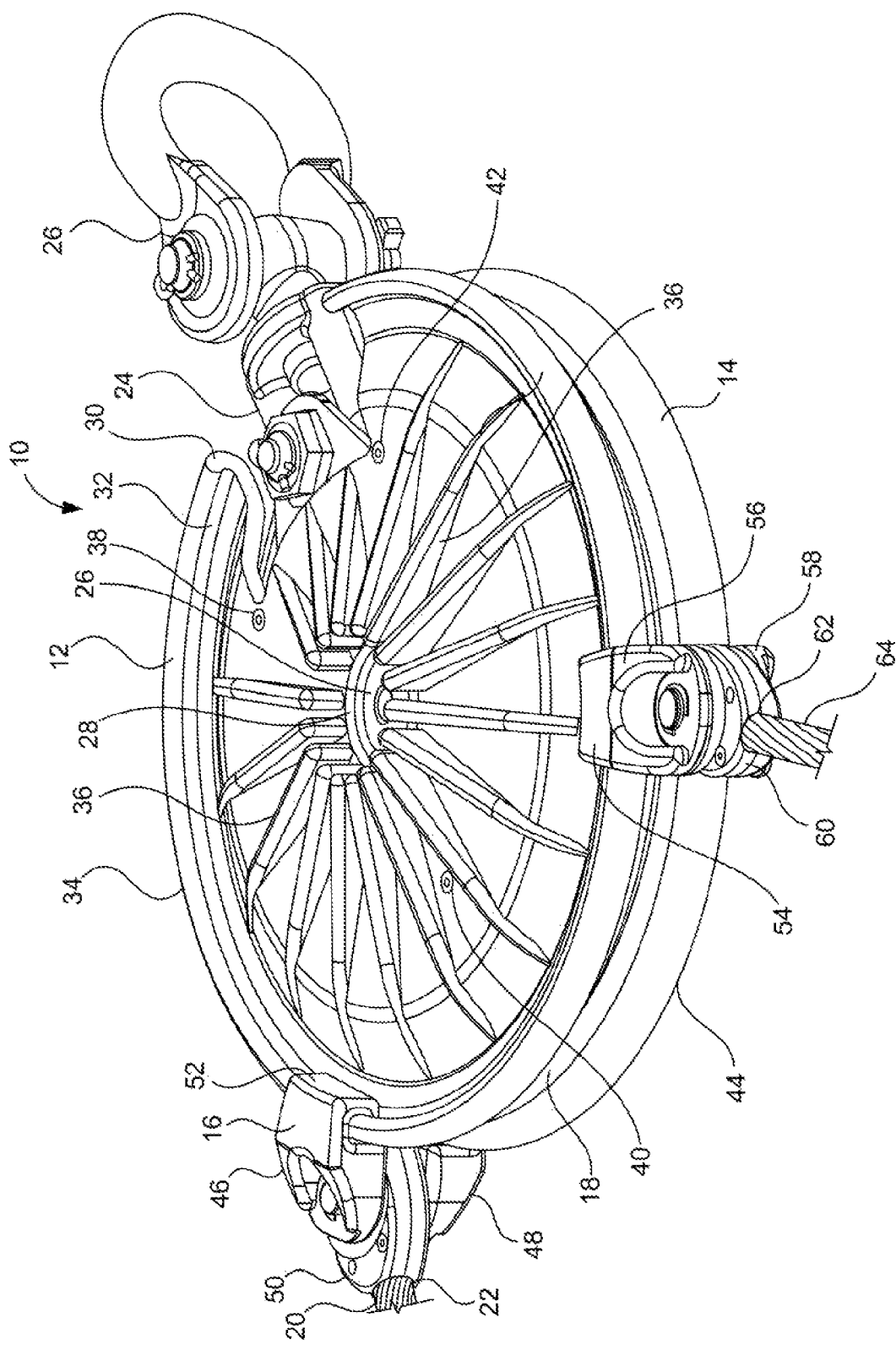
FIG. 1 is a perspective view of the safety apparatus of the present invention.

Referring to FIG. 1, there shown the safety apparatus 10 in accordance with the preferred embodiment of the present invention. The safety apparatus 10 includes a first plate 12 suitable for placement over one side of the sheave, a second plate 14 suitable for placement over an opposite side of the sheave, and a carriage 16 is positioned at the peripheries of each of the first plate 12 and the second plate 14. As can be seen, the carriage 16 extends across a gap 18 between the first plate 12 the second plate 14. The carriage 16 is movable along the peripheries of the first plate 12 and the second plate 14. A cable 20 extends through a hole 22 in the carriage 16. The cable 20 is freely movable through the hole 22 of the carriage 16.

In FIG. 1, it can be seen that there is a sheave 24 having a shackle 26 extending outwardly therefrom. The sheave 24 will have an axle 26 located centrally of the lint plate 12 the second plate 14. An opening 28 is formed in each of the plates 12 and 14 so as to accommodate the axle 26 of the sheave 24. Each of the plates 12 and 14 has a cut out 30 formed therethrough so as to accommodate the connecting portions of the sheave 24 with the shackle 26.

The first plate 12 is illustrated as having a track 32 formed adjacent to the periphery 34 of the first plate 12. The track 32 extends substantially around the outer portion of the plate 12. A plurality of ribs 36 radiate from the opening 28 toward the track 32. Ribs 36 have a greatest thickness adjacent to the opening 24 and a reduced thickness adjacent to the track 32. A plurality of ribs 36 are configured so as to enhance the structural integrity of each of the plates 12 and 14. The plates 12 and 14 will have an identical configuration.

A plurality of fasteners 38, 40 and 42 are illustrated as positioned on the outer surface of the first plate 12. Fasteners 38, 40 and 42 will extend between the first plate 12 and the second plate 14 so as to secure the plates 12 and 14 over the exterior surfaces of the sheave 24. As will be described hereinafter, spacers are located between the plates 12 and 14 so as to establish the gap 18 therebetween. The use of the fasteners 38, 40 and 42 allows the plates 12 and 14 to adapt to various sizes and thicknesses of sheaves located between the plates 12 and 14.

The first carriage 16 is illustrated as positioned at the periphery 34 of the first plate 12. The carriage 16 will also be positioned at the periphery 44 of the second plate 14. The carriage 16 includes a first body 46, a second body 48 and a discoidal member 50. The first body 46 has a portion 52 that is positioned within the track 32 at the periphery 34 the first plate 12. The second body 48 will similarly have a portion that is received within the track of the second plate 44. As such, the bodies 46 and 48 of the carriage 16 can freely slide around the track 32 on the plates. The discoidal member 50 is pivotally mounted to the bodies 46 and 48. The discoidal member 50 will have an interior suitable for allowing the cable 20 to extend therethrough.

Another carriage 54 is also positioned at the periphery 34 of the first plate 12. The carriage 54 will also be positioned at the periphery 44 of the second plate 14. Carriage 54 will have an identical configuration to that of carriage 16. The carriage 54 will include a first body 56, a second body 58, and a discoidal member 60. The discoidal member 60 is pivotally mounted relative to the first body 56 and the second body 58. The discoidal member 60 has a hole 62 extending therethrough. Another portion 64 of the cable 20 will extend through the hole 62 of the carriage 54. Since a sheave is located within the interior formed between the first plate 12 and a second plate 14, the carriages 16 and 54 accommodate the separate portions of the cable. As such, the carriages 16 and 54 can adapt to various orientations of the cable 20 as it extends around the sheave.

Figure 2:
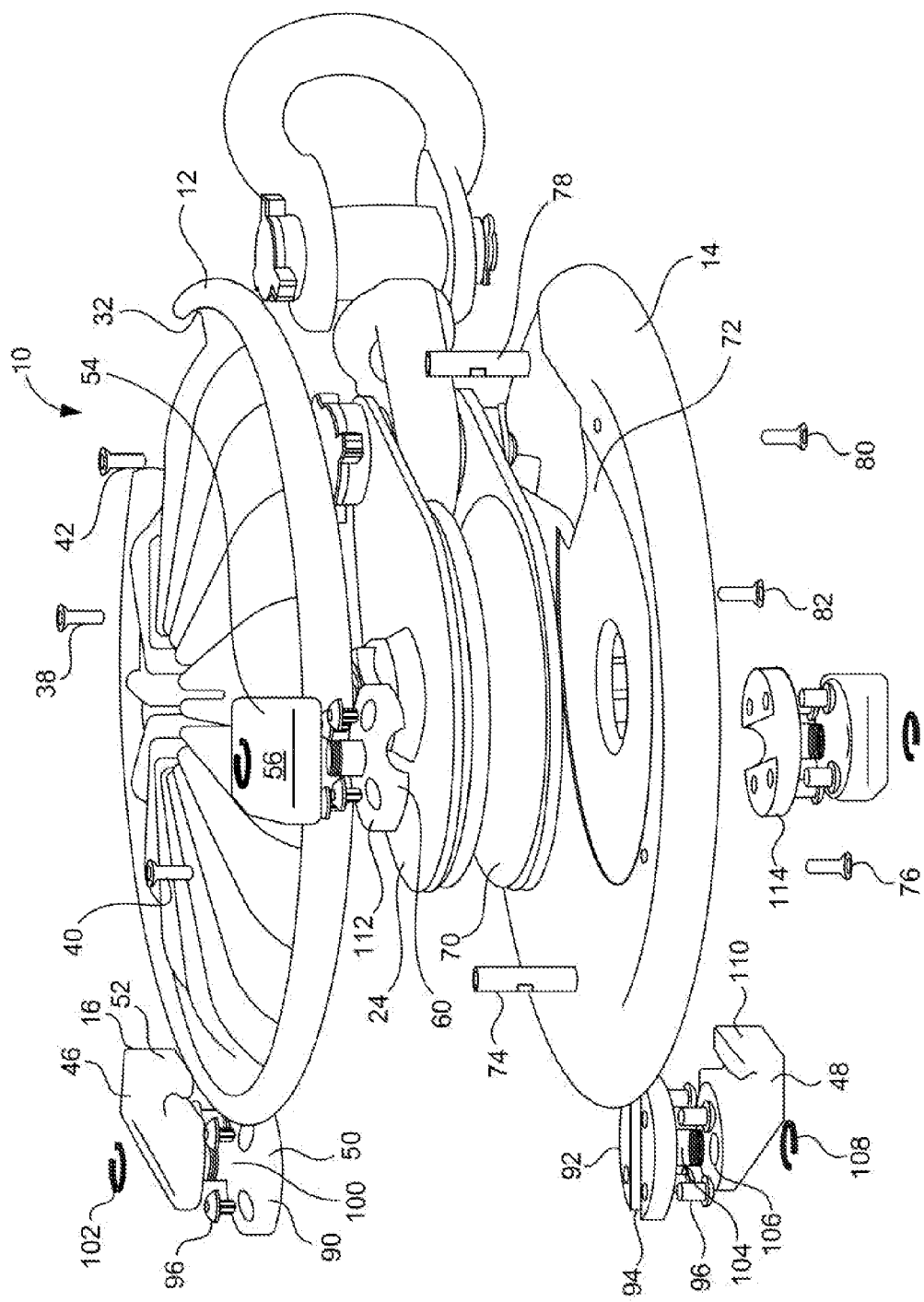
FIG. 2 is an exploded view of the safety apparatus of the present invention.

FIG. 2 is an exploded view of the safety apparatus 10 of the present invention. In particular, plates 12 and 14 are illustrated. The sheave 24 is illustrated as positioned within the area between the first plate 12 and the second plate 14. The normal use, the sheave 24 will have a cable extending around the pulley 70.

In FIG. 2, it can be seen that the second plate 14 has a counterbore 72 formed on the inner surface thereof. The first plate 12 will similarly have a counterbore formed on the inner surface thereof (not shown). This counterbore 72 serves to receive the periphery of the sheave 24 such that the sheave 24 will suitably nest within the plates 12 and 14.

Fasteners 38, 40 and 42 are configured so as to secure the first plate 12 in spaced relationship to the second plate 14. In particular, a spacer 74 will serve to receive the fastener 40 associated with the first plate 12 and a fastener 76 associated with the second plate 14. Another spacer 78 will extend between the first plate 12 in the second plate 14. Spacer 78 will serve to receive the fastener 42 associated with the first plate 12 and the fastener 80 associated with the second plate 14. Another spacer (not shown) will extend between the plates 12 and 14 so as to receive the fastener 38 therein, along with the fastener 82 associated with the second plate 14. As such, the plates 12 and 14 can be easily retrofitted to the sheave 24 without the need to remove the axle from the sheave. As such, the safety apparatus 10 is easily attached to and adaptable with various configurations of the sheave 24.

In FIG. 2, the carriage 16 is illustrated. Carriage 16 has a portion 52 that is configured so as to be received within the track 32 of the first plate 12. The portion 52 is in the nature of a finger that extends downwardly from the body 46 so as to engage with the track 32. The configuration of this portion 52 allows a small degree of flexibility between the inner surface of the portion 52 and the track 32. As such, this facilitates the ability of the body 46 to deflect in accordance with various orientations of the cable as extending from the sheave 24.

The discoidal member 50 includes a first track member 90 and a second track member 92. The first track. member 90 is pivotally connected to the first body 46 of the carriage 16. The second track member 92 is pivotally secured to the second body 48 of the carriage 16. The track members 90 and 92 will have an identical configuration. The second track member 92 is illustrated as having a track 94 extending diametrically thereacross. The track member 90 will similarly have a track extending diametrically thereacross. Fasteners 96 are provided in association with the first track member 90 and the second track member 92 so as to fix the track members 90 and 92 together such that the tracks of each of the track members 90 and 92 will be aligned. As such, the carriage 16 can be easily assembled over the cable extending from the sheave 24.

An axle 100 extends upwardly from the first track member 90. The axle 100 includes a suitable notch extending therearound at an upper end thereof. The axle 100 will extend through a hole formed in the first body 46. A first C-ring 102 will be affixed over the notch formed in the upper end of the axle 100 so as to secure the axle 100 in rotatable relationship within the hole of the first body 46. Similarly, the second track member 92 will have an axle 104 extending downwardly therefrom. Axle 144 will extend through the hole 106 formed in the second body 48. Axle 104 has a notch extending therearound at a lower end of the axle 144. As such, a second C-ring 108 can secure the axle 104 in rotatable relationship within the hole 106.

In FIG. 2, the second body 48 is illustrated as having a portion 110 extending outwardly therefrom. Portion 110 is in the nature of a finger that is flexibly received within the tracks formed in the second plate 14. As such, the first body 46 and the second body 48 will move in correspondence around the respective tracks formed on the plates 12 and 14.

FIG. 2 illustrates the carriage 54 as having a first body 56 and a second body 58. The carriage 54 will have an identical configuration to that of carriage 16. As such, the carriage 54 will also include a first track member 112 and a second track member 114. The track members 112 and 114 will form the discoidal member 60 of the carriage 54.

Figure 3:
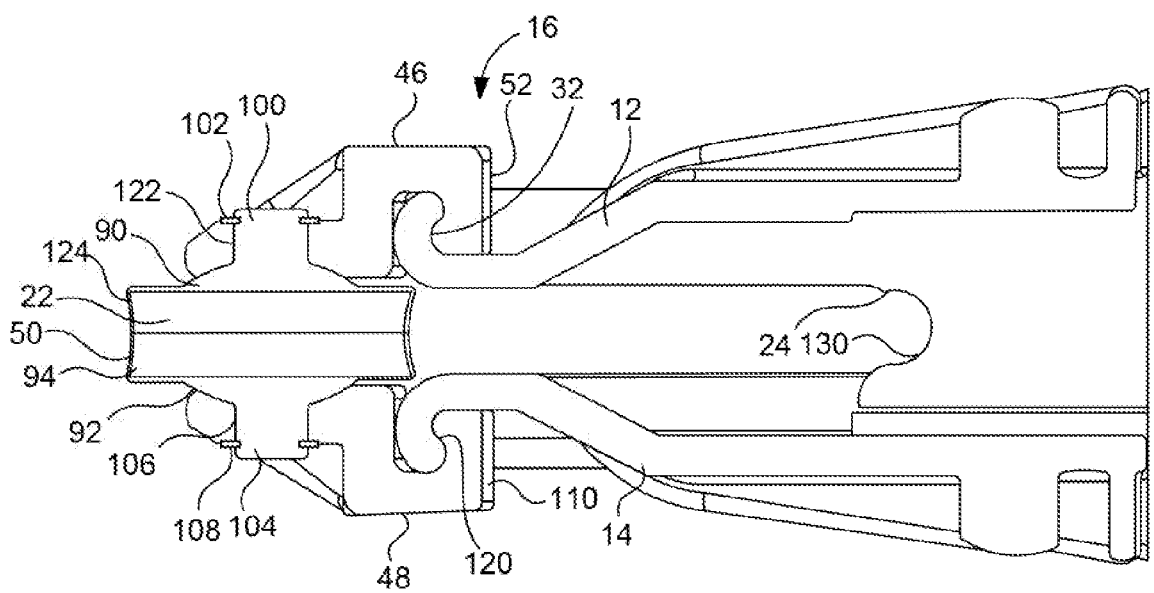
FIG. 3 is a cross-sectional view illustrating, in particular, the configuration of the carriage as mounted to the periphery of the first and second plates of the safety apparatus of the present invention.

FIG. 3 is a cross-sectional view illustrating the configuration of the carriage 16. It can be seen that the carriage 16 includes the first body 46 and the second body 48. The fast body 46 has portion 52 extending therefrom and engaged within the track 32 of the first plate 12. It can be seen that the relationship between the portion 52 and the track 32 of the first plate 12 provides a certain amount of flexibility in the connection. FIG. 3 also shows that the second body 48 has portion 110 extending so as to be received within the track 120 of the second plate 14.

The first body 46 has a hole 122 extending therethrough. Similarly, the second body 48 has hole 106 extending therethrough. Holes 106 and 122 are axially aligned. The discoidal member 50 has first track member 90 and second track member 92. A track 124 is illustrated as formed within the first track member 90. Track 94 is formed in the second track member 92. When the fasteners 96 serve to secure the track members 90 and 92 together, the tracks 94 and 124 will be aligned with each other so as to form the hole 22 through which the cable will pass.

The axle 100 extends upwardly from the first track member 90 and is rotatably received within the hole 122. The C-ring 102 fixes the axle 100 within the hole 122 in rotatable relationship therewith. The second track member 92 also has axle 104 extending therefrom. Axle 104 is received within the hole 106. C-ring 108 is affixed to the axle 104 so as to rotatably fix the axle 104 within the hole 106. As a result of this connection, the discoidal member 50 can rotate freely with respect to the first body 46 and the second body 48.

In FIG. 3. it can be seen that the hole 22 of the carriage 16 is axially aligned with the notch 130 of the sheave 24. As such, as cable is payed out or payed in, the cable will travel freely through the hole 22. Since the cable can have various orientations with respect to the sheave 24, the rotatability of the discoidal member 50 facilitates the ability to compensate for any changes in the orientation of the cable. Similarly, the ability of the carriage 16 to move around the tracks of the first plate 12 in the second plate 14 further facilitates the ability of the carriage 16 to adapt to the orientations of the cable.

In normal use, a pulling force can be applied to the cable 20. This pulling force will cause another portion of the cable to be drawn inwardly through the carriage. If the worker is guiding the other portion of the cable when a pulling force is applied to the cable, the entry of the worker's hands into the areas of the sheave 24 is prevented by the blocking caused by the end surfaces of the discoidal member 50 or the discoidal member 60. As such, any injury to the hands of the workers elf prevented. The holes 22 and 62 have a diameter only slightly greater than the outer diameter of the cable such that the possibility of a glove being drawn into the interior of the plates 12 and 14 is effectively prevented. Any injuries are prevented by the blocking effect caused by the carriages.

The split of the discoidal member in the first track member and the second track member serve as cosign compensators with relationship to the pitch diameter of the sheave relative to the center line of the carriages. The counterbore of the inner wall of the plates profiles the outer edge of the sheave block. This assures that the sheave block will always stay in the same relationship to the plates. The equal length standoffs between the plates provide a fixed parallel gap that allows the wire rope to enter and exit the safety apparatus Win order to track around a portion of the sheave track and exit the other side. The discoidal member is designed so as to articulate in a cosign-compensation manner. This tends to operate in the same manner as old-styled drafting machines. Such a drafting machine would have a right angle protractor mechanism in which two scales are attached in the same clamped orientation. Such a right angle protractor mechanism is hard fixed to an elbow joint and a pair of parallel bars. As the drafter moves the drafting machine about the table, the scales will always remain parallel to the base. The safety apparatus of the present invention will act in a similar manner in relation to the pitch diameter of the sheave. The present invention also allows for small angular side-to-side movements of the cable because there is a ball-and-socket feature between the interface of the bodies of the carriage and the portion that rides within the track of the plates.

The present invention avoids the need to remove the center shaft of the sheave. The plates fit over the existing nut and head of the sheave. The present invention avoids any interference with attachment. The present invention further avoids the need for offset legs. The outer plates of the safety apparatus 10 of the present invention form fit around the plate geometry of the sheave. Since the plates are of the same configuration and since the track members of the carriage are of the same configuration, only a single mold is required for each of these components. As such, manufacturing cost is greatly reduced. The configuration of the safety apparatus 10 of the present invention is scalable to the size of the sheave. The safety apparatus is extremely light. The ability to manufacture the safety apparatus the present invention through the use of injection molding techniques and polymer technology allows color to be molded in. Also, an identifying trademark and model number can also be molded in. The present invention provides a unique cosign and compensation of the center line of the cable relative to the sheave yoke track.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A safety apparatus for use with a sheave which has a cable extending therefrom, the safety apparatus comprising:
   a first plate adapted to be placed on one side of the sheave;
   a second plate adapted to be placed on an opposite side of the sheave; and
   a carriage positioned at a periphery of each of said first and second plates, said carriage extending across a gap between said first and second plates, said carriage movable along the peripheries of said first and second plates, said carriage suitable for receiving a portion of the cable therein, each of said first and second plates having a concave disc shape in which the peripheries of said first and second plates are separated by distance less than a distance between centers of said first and second plates.

2. The safety apparatus of claim 1, further comprising:
   a plurality of fasteners extending between said first and second plates so as to fix a position of said first and second plates relative to the sheave.

3. The safety apparatus of claim 1, said first plate having a counterbore on an inner surface thereof, said counterbore corresponding to an outer diameter of the sheave.

4. The safety apparatus claim 1, said first plate having identical configuration to that of said second plate.

5. The safety apparatus of claim 1, each of said first and second plates having an opening formed of a center thereof, said opening adapted to be positioned at an axle of the sheave.

6. The safety apparatus of claim 1, said carriage having a hole extending therethrough, said hole of said carriage having a diameter greater than a diameter of the cable such that the cable can freely slide through said hole.

7. The safety apparatus of claim 1, each of said first and second plates having a track formed at the periphery thereof, said carriage having a first portion received in the track of said first plate and a second portion received in the track of said second plate.

8. The safety apparatus of claim 1, said carriage comprising:
   a first body having a portion positioned at the periphery of said first plate;
   a second body having a portion positioned at the periphery of said second plate; and
   a discoidal member pivotally mounted to said first and second bodies, said discoidal member having a hole therein which is adapted to allow the cable to extend therethrough.

9. The safety apparatus of claim 8, said discoidal member comprising:
   a first track member pivotally mounted to said first body, said first track member having a track formed therein; and
   a second track member pivotally mounted to said second body, said second track member having a track formed therein.

10. The safety apparatus of claim 9, said first track member affixed to said second track member such that said track of said first track member is aligned with said track of said second track member.

11. The safety apparatus of claim 10, said first body having a hole formed therein in a location away from the periphery of said first plate, said second body having a hole formed therein away from the periphery of said second plate, said first track member having an axle extending therefrom and received in said hole of said first body, said second track member having an axle extending therefrom and received in said hole of said second body.

12. The safety apparatus of claim 11, further comprising:
   a first C-ring secured to said axle of said first body; and
   a second C-ring secured to said axle of said second body, said axles of said first and second bodies being freely rotatable within said holes of said first and second bodies.

13. A safety apparatus for use with a sheave which has a cable extending therefrom, the safety apparatus comprising:
   a first plate adapted to be placed on one side of the sheave;
   a second plate adapted to be placed on an opposite side of the sheave; and
   a carriage positioned at a periphery of each of said first and second plates, said carriage extending across a gap between said first and second plates, said carriage movable along the peripheries of said first and second plates, said carriage suitable for receiving a portion of the cable therein, said carriage comprising:
   a first carriage; and
   a second carriage, each of said first and second carriages being independently movable at the peripheries of said first and second plates, said first carriage suitable for receiving a first portion of the cable, said second carriage suitable for receiving a second portion of the cable therein.

14. A safety apparatus comprising:
   a sheave having a diameter, said sheave having the cable extending therearound;
   a first plate positioned over one side of said sheave;
   a second plate positioned on an opposite side of said sheave; and
   a carriage positioned at a periphery of each of said first and second plates, said carriage extending across a gap between said first and second plates, said carriage movable along the peripheries of said first and second plates, said carriage receiving a portion of the cable therein, said carriage comprising:

a first body having a portion positioned at the periphery of said first plate;

a second body having a portion positioned at the periphery of said second plate; and a discoidal member pivotally mounted to said first and second bodies, said discoidal member having an interior, said cable freely movable through said interior of said discoidal member.

15. The safety apparatus of claim 14, said first and second plates each having a diameter greater than said diameter of said sheave.

16. The safety apparatus of claim 14, said sheave having a thickness, each of said first and second plates having a concave disk shape in which the peripheries of said first and second plates are separated by a distance, said distance between the peripheries of said first and second plates being less than said thickness of said sheave.

17. The safety apparatus of claim 14, each of said first and second plates having a counterbore formed on an inner surface thereof, said sheave having exterior surfaces received in the counterbores of said first and second plates.

18. The safety apparatus of claim 14, said carriage comprising:

a first carriage; and a second carriage, each of said first and second carriages being independently movable at the peripheries of said first and second plates, said first carriage receiving a first portion of the cable therein, said second carriage receiving a second portion of the cable therein.

* * * * *